United States Patent

Hiraiwa

[11] Patent Number: 4,674,346
[45] Date of Patent: Jun. 23, 1987

[54] TRANSMISSION WITH REVERSE AND FIFTH SPEED SYNCHRONIZER

[75] Inventor: Kazuyoshi Hiraiwa, Atsugi, Japan

[73] Assignee: Nissan Motor Company, Limited, Japan

[21] Appl. No.: 682,301

[22] Filed: Dec. 17, 1984

[30] Foreign Application Priority Data

Dec. 16, 1983 [JP] Japan .................. 58-236095

[51] Int. Cl.⁴ .............................. F16H 3/08
[52] U.S. Cl. ........................ 74/339; 74/359; 74/363; 74/375
[58] Field of Search ............ 74/359, 360, 362, 363, 74/373, 374, 375, 339; 192/53 B, 53 F

[56] References Cited

U.S. PATENT DOCUMENTS

| 3,115,048 | 12/1963 | Cape | 74/363 X |
|---|---|---|---|
| 3,916,712 | 11/1975 | Kelbel et al. | 74/363 X |
| 4,016,773 | 4/1977 | Galas et al. | 74/333 |
| 4,228,693 | 10/1980 | Kelbel | 74/339 |
| 4,294,338 | 10/1981 | Simmons | 192/4 A |
| 4,467,665 | 8/1984 | Katayama et al. | 74/339 |
| 4,515,031 | 5/1985 | Janson | 74/375 X |

FOREIGN PATENT DOCUMENTS

| 0022411 | 1/1981 | European Pat. Off. | |
| 3233619 | 3/1984 | Fed. Rep. of Germany | |
| 103150 | 8/1980 | Japan | 74/363 |
| 107455 | 7/1982 | Japan | 74/359 |
| 1179838 | 2/1970 | United Kingdom | |
| 1225448 | 3/1971 | United Kingdom | |
| 1461328 | 1/1977 | United Kingdom | |
| 1493035 | 11/1977 | United Kingdom | |
| 2067250 | 7/1981 | United Kingdom | |
| 1599797 | 10/1981 | United Kingdom | |
| 2127114 | 4/1984 | United Kingdom | |

Primary Examiner—Rodney H. Bonck
Assistant Examiner—Dwight G. Diehl
Attorney, Agent, or Firm—Leydig, Voit & Mayer

[57] ABSTRACT

A rotatable reverse gear is supported on a counter shaft. A member rotates and stops as an output shaft rotates and stops respectively. A device matches the rotational speed of the reverse gear to the rotational speed of the member when a transmission is shifted toward its reverse position.

15 Claims, 3 Drawing Figures

TRANSMISSION WITH REVERSE AND FIFTH SPEED SYNCHRONIZER

BACKGROUND OF THE INVENTION

1. Field of the Invention

This invention relates to a transmission, such as an automotive manual transmission.

2. Description of the Prior Art

U.S. Pat. No. 4,294,338 discloses a manual transmission including a synchronizer acting on a reverse section. The reverse synchronizer has a synchronizing ring which can be moved via a coupling sleeve. The ring has a synchronizing surface engageable with a mating surface on the stationary transmission casing. As the gear shift lever is moved toward its reverse gear position, the coupling sleeve moves the synchronizing ring, engaging the mating surfaces on the ring and casing. This engagement between the surfaces arrests rotation of the ring. At that time, since the transmission counter shaft is also coupled to the synchronizing ring, rotation of the counter shaft also stops. As a result, the reverse gear mounted on the counter shaft become stationary. In this case, all of the reverse gears are stationary. Accordingly, when the control lever is subsequently shifted into its reverse position, the reverse gears engage without shock or noise.

In this conventional transmission, when the shift lever is in one of the normal gear positions other than the reverse gear position, the reverse synchronizing ring rotates together with the counter shaft. Thus, the synchronizing surface on the ring rotates relative to the mating surface on the transmission casing. It should be noted that the transmission casing is stationary. The friction between the mating surfaces on the ring and the casing offers resistance to rotation of the counter shaft and other moving parts, providing a loss of kinetic energy. This friction also wears down the synchronizing ring.

SUMMARY OF THE INVENTION

It is an object of this invention to provide an efficient transmission.

In accordance with this invention, a transmission includes a counter shaft and a rotatable output shaft. A reverse gear is supported on the counter shaft. A member rotates and stops as the output shaft rotates and stops respectively. A device matches the rotational speed of the reverse gear to the rotational speed of the member when the transmission is shifted toward its reverse position.

BRIEF DESCRIPTION OF THE DRAWINGS

Corresponding and like elements are denoted by the same reference characters throughout the drawings.

DETAILED DESCRIPTION OF THE PREFERRED EMBODIMENTS

Figure 1:
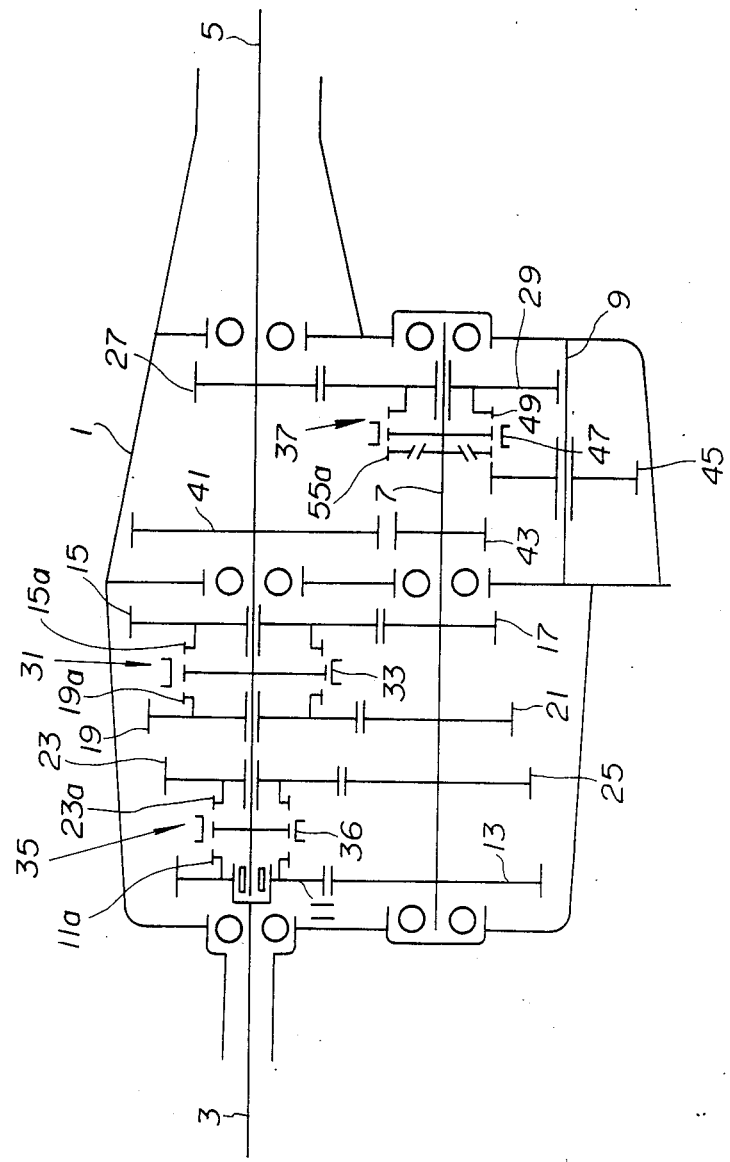
FIG. 1 is a diagram of a transmission according to a first embodiment of this invention.

With reference to FIG. 1, a transmission includes a casing 1 into which an input shaft 3 and an output shaft 5 extend. These shafts 3 and 5 are rotatably supported by the casing 1. The shafts 3 and 5 align axially. A counter shaft 7 and an reverse idler shaft 9 both extending parallel to the output shaft 5 are housed within and supported by the casing 1. The counter shaft 7 is rotatable relative to the casing 1, but the idler shaft 9 is stationary.

In automotive cases, the input shaft 3 is coupled to the crankshaft of an engine (not shown) via a main clutch (not shown) and the output shaft 5 is connected to vehicle wheels (not shown).

A main gear 11 fixedly mounted on the input shaft 3 is in constant mesh with a counter gear 13 fixedly mounted on the counter shaft 7. A first speed gear 15 journaled on the output shaft 5 is in constant mesh with a counter gear 17 fixedly mounted on the counter shaft 7. A second speed gear 19 journaled on the output shaft 5 is in constant mesh with a counter gear 21 fixedly mounted on the counter shaft 7. Similarly, a third speed gear 23 journaled on the output shaft 5 is in constant mesh with a counter gear 25 fixedly mounted on the counter shaft 7. The first, second and third speed gears 15, 19 and 23 can all rotate relative to the output shaft 5. A fifth speed gear 27 fixedly mounted on the output shaft 5 is in constant mesh with a counter gear 29 journaled on the counter shaft 7. The gear 29 can rotate relative to the counter shaft 7.

A first/second-speed clutch 31 incorporating a synchronizer includes a coupling sleeve 33 concentrically supported on a section of the output shaft 5 between the first and second speed gears 15 and 19. The coupling sleeve 33 can move axially relative to the output shaft 5. When the coupling sleeve 33 moves into its first speed position, clutch teeth on the sleeve 33 engage matching clutch teeth 15a on the first speed gear 15, thereby locking the first speed gear 15 to the output shaft 5 as in conventional transmissions. When the coupling sleeve 33 moves into its second speed position, the clutch teeth on the sleeve 33 engage matching clutch teeth 19a on the second speed gear 19, thereby locking the second speed gear 19 to the output shaft 5 as in conventional transmissions. When the coupling sleeve 33 is in its neutral position, both of the gears 15 and 19 can rotate freely with respect to the output shaft 5.

A third/fourth-speed clutch 35 incorporating a synchronizer includes a coupling sleeve 36 concentrically supported on a section of the output shaft 5 between the main gear 11 and the third speed gear 23. The coupling sleeve 36 can move axially relative to the output shaft 5. When the coupling sleeve 36 moves into its third speed position, clutch teeth 23a on the sleeve 36 engage matching clutch teeth on the third speed gear 23, thereby locking the third speed gear 23 to the output shaft 5 as in conventional transmissions. When the coupling sleeve 36 moves into its fourth speed position, the clutch teeth on the sleeve 36 engage matching clutch teeth 11a on the main gear 11, thereby locking the main gear 11 to the output shaft 5 as in conventional transmissions. When the coupling sleeve 36 is in its neutral position, both of the gears 11 and 23 are free to rotate relative to the output shaft 5.

The coupling sleeves 33 and 36 are connected to a gear shift lever (not shown) so that they are manually drivable via the shift lever. When the shift lever is in its first speed position, the input shaft 3 is coupled to the output shaft 5 via the main gears 11 and 13 and via the first speed gears 15 and 17. When the shift lever is in its second speed position, the input shaft 3 and the output shaft 5 are coupled via the main gears 11 and 13 and via the second speed gears 19 and 21. When the shift lever is in its third speed position, the input shaft 3 and the output shaft 5 are coupled via the main gears 11 and 13 and via the third speed gears 23 and 25. When the shift lever is in its fourth speed position, the third/fourth-speed clutch 35 directly couples the input shaft 3 and the output shaft 5. When the shift lever is in its fifth speed position, the input shaft 3 and the output shaft 5 are coupled via the main gears 11 and 13 and via the fifth speed gears 27 and 29. It should be noted that a fifth-speed clutch 37, described in more detail later, locks the gear 29 to the counter shaft 7 when the shift lever is in its fifth speed position.

Figure 2:
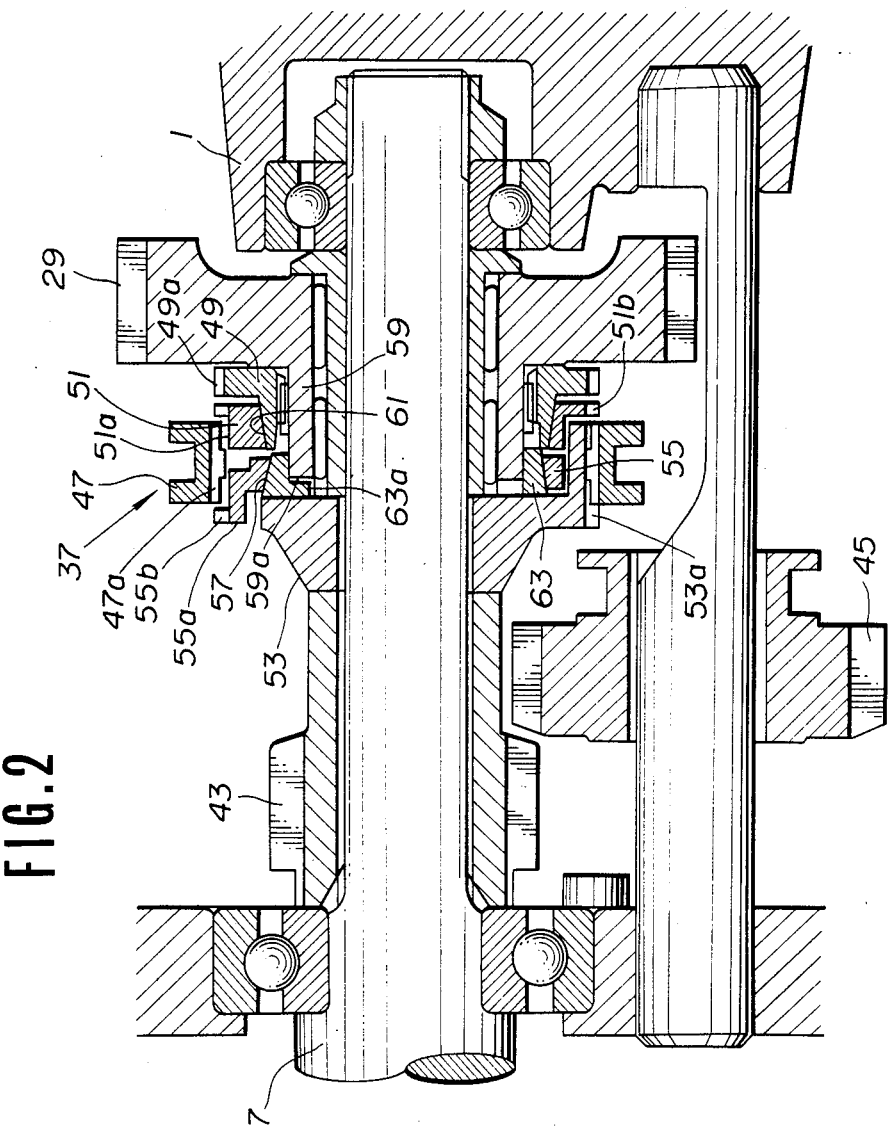
FIG. 2 is a longitudinal section view of a reverse section of FIG. 1 and associated members.

Reverse gears 41 and 43 are mounted on the output shaft 5 and the counter shaft 7 respectively. The reverse gears 41 and 43 are connectable via a reverse idler gear 45. As shown in FIGS. 1 and 2, the reverse idler gear 45 is rotatably supported on the reverse idler shaft 9. The reverse idler gear 45 is free to slide axially with respect to the shaft 9. When the reverse idler gear 45 slides into its operative position, it engages both of the reverse gears 41 and 43 so that the input shaft 3 and the output shaft 5 are coupled via the main gears 11 and 13 and via the reverse gears 41, 43, and 45. When the reverse idler gear 45 returns from its operative position to its rest position, it disengages from both of the reverse gears 41 and 43. The reverse idler gear 45 is connected to the shift lever so as to be drivable via the shift lever. When the shift lever is in its reverse position, the reverse idler gear 45 is in its operative position. When the shift lever is in any other positions, the reverse idler gear 45 is in its rest position.

As shown in FIGS. 1 and 2, the fifth-speed clutch 37 includes synchronizer elements including a coupling sleeve 47, a gear spline ring 49, a fifth-speed synchronizing ring 51, a clutch hub 53, and a reverse synchronizing ring 55.

The gear spline ring 49 is splined onto a boss 59 of the fifth speed gear 29 so that it rotates together with the gear 29. A synchronizing cone surface or tapered surface 61 is fomred on the gear spline ring 49. The fifth-speed synchronizing ring 51 has an inner tapered surface mating with the synchronizing surface 61. The synchronizing ring 51 is so positioned relative to the gear spline ring 49 that the tapered surface of the synchronizing ring 51 engageably opposes the synchronizing surface 61. Projections 51a extending axially and radially outward from the synchronizing ring 51 are received in axial grooves (not shown) in the clutch hub 53 so that the synchronizing ring 51 rotates together with the clutch hub 53 but is axially movable relative to the clutch hub 53. Axial movement of the synchronizing ring 51 enables the tapered surface of the ring 51 to engage with and separate from the synchronizing surface 61. Since the clutch hub 53 is fixed to the counter shaft 7, the synchronizing ring 51 rotates together with the counter shaft 7 but is free to move axially with respect to the counter shaft 7.

The boss 59 of the fifth speed gear 29 has a free end on which an annular member 63 fits. Projections 63a extending radially inward from the annular member 63 are received in recesses 59a in the free end of the boss 59 so that the annular member 63 rotates together with the fifth speed gear 29. A synchronizing cone or tapered surface 57 is formed on the annular member 63. The reverse synchronizing ring 55 has an inner tapered surface mating with synchronizing surface 57. The synchronizing ring 55 is so positioned relative to the annular member 63 that the tapered surface of the synchronizing ring 55 engageably opposes the synchronizing surface 57. Projections 55a extending axially from the synchronizing ring 55 and generally aligning axially with the projections 51a are received in the axial grooves in the clutch hub 53 so that the synchronizing ring 55 rotates together with the clutch hub 53 and the counter shaft 7 but is axially movable relative to them. Axial movement of the synchronizing ring 55 enables the tapered surface of the ring 55 to engage with and separate from the synchronizing surface 57.

The coupling sleeve 47 has axially-extending internal teeth 47a in constant mesh with axially-extending external teeth 53a on the clutch hub 53. Therefore, the coupling sleeve 47 rotates together with the clutch hub 53 and the counter shaft 7 but is axially movable relative to them. The coupling sleeve 47 is axially positioned between and overlapping the synchronizing rings 51 and 55. The synchronizing rings 51 and 55 both have axially-extending external blocker teeth 51b and 55b engageable with the internal teeth 47a on the coupling sleeve 47 and spaced so as to allow the coupling sleeve 47 to engage either when the latter is in an intermediate position.

When the coupling sleeve 47 moves toward its fifth speed position, it approaches the fifth-speed synchronizing ring 51 and then the internal teeth 47a on the sleeve 47 encounter the external blocker teeth 51b on the ring 51. Thereafter the coupling sleeve 47 forces the synchronizing ring 51 into engagement with the synchronizing surface 61 of the gear spline ring 49. This engagement synchronizes the gear spline ring 49 and the coupling sleeve 47 in terms of rotational speed. Opposing edges of the teeth 47a and 51b on the sleeve 47 and the ring 51 have chamfers, so that the teeth 47a on the sleeve 47 can be forced into alignment with and into normal or complete engagement with the teeth 51b on the ring 51 upon and immediately after their meeting. The engagement between the teeth 47a and 51b on the sleeve 47 and the ring 51 enables the teeth 47a on the sleeve 47 to align with axially-extending external teeth 49a on the gear spline ring 49 engageable with the teeth 47a. Upon completion of the movement of the coupling sleeve 47 into its fifth speed position, its internal teeth 47a move into engagement with the external teeth 49a on the gear spline ring 49 so that the fifth speed gear 29 is locked into corotation with the counter shaft 7.

When the coupling sleeve 47 moves toward its reverse position, it approaches the reverse synchronizing ring 55 and then the internal teeth 47a on the sleeve 47 encounter the external blocker teeth 55b on the ring 55. Thereafter the coupling sleeve 47 forces the synchronizing ring 55 into engagement with the synchronizing surface 57 of the annular member 63. This provides means for synchronizing the rotational speed of the reverse gear to the rotational speed of the annular member 63 and the coupling sleeve 47. Opposing edges of the teeth 47a and 55b on the sleeve 47 and the ring 55 have chamfers, so that the teeth 47a on the sleeve 47 are forced into alignment with and into normal or complete engagement with teeth 55b on the ring 55.

It should be noted that a limited amount of rotary lost motion between the coupling sleeve 47 and the synchronizing ring 55 is provided for. Accordingly, if the coupling sleeve 47 and the annular member 63 are not in synchronization, the synchronizing ring 55 is angularly moved relative to the sleeve 47 as the sleeve 47 engages the ring 55. At this time, the internal teeth 47a on the sleeve 47 become misaligned with the external blocker teeth 55b on the ring 55. This enables the coupling sleeve 47 to force the ring 55 axially as the sleeve 47 further moves. When the internal teeth 47a on the sleeve 47 are in complete engagement with the external blocker teeth 55b on the ring 55, axial force on the ring 55 is released providing a means for disabling the synchronizing means since the tapered surface on the ring 55 is disengaged from the synchronizing surface 57 on the annular member 63 and the counter shaft 7 and the reverse gear 43 are free to rotate relative to the fifth speed gear 29.

The coupling sleeve 47 is connected to the shift lever so that it is drivable via the shift lever. When the shift lever moves into and out of its fifth speed position and reverse position, the coupling sleeve 47 slides into and out of its corresponding positions.

In automotive cases, this transmission operates as follows: under conditions where the vehicle is running, as the shift lever is shifted toward its fifth speed position, the coupling sleeve 47 forces the synchronizing ring 51 into engagement with the synchronizing surface 61 of the gear spline ring 49. This engagement synchronizes the coupling sleeve 47 and the gear spline ring 49. As the shift lever settles completely into its fifth speed position, the coupling sleeve 47 engages the gear spline ring 49 so that the fifth speed gear 29 is locked to the counter shaft 7. Thus, the input shaft 3 and the output shaft 5 are coupled via the main gears 11 and 13 and via the fifth speed gears 27 and 29. As long as the shift lever remains in its fifth speed position, since the reverse synchronizing ring 55 and the annular member 63 rotate together at the same speed, there is no loss of kinetic energy resulting from the friction between the tapered surfaces of the ring 55 and the member 63.

Under conditions where the vehicle is stationary but the engine is running, when the main clutch is disengaged, the counter shaft 7, the clutch hub 53, the coupling sleeve 47, and the reverse synchronizing ring 55 all continue to rotate due to inertia. At this time, the annular member 63 and the fifth speed gear 29 remain stationary, since they are connected to the vehicle wheels via the fifth speed gear 27 and the output shaft 5. As the shift lever is moved toward its reverse position immediately after the disengagement of the main clutch, the coupling sleeve 47 forces the synchronizing ring 55 into engagement with the synchronizing surface 57 of the annular member 63. This engagement arrests the rotation of the synchronizing ring 55, the coupling sleeve 47, the clutch hub 53, and the counter shaft 7. Since the reverse gear 43 is fixed to the counter shaft 7, it also stops rotating. The reverse gear 41 is already stationary, since it is fixed to the output shaft 5. Then, the internal teeth 47a on the coupling sleeve 47 are moved into complete engagement with the external blocker teeth 55b on the synchronizing ring 55. In this case, the counter shaft 7 and the reverse gear 43 are allowed to rotate relative to the fifth speed gear 29 once again. As the shift lever settles fully into its reverse position, the reverse idler gear 45 is moved into engagement with the reverse gears 41 and 43. This engagement is smooth and does not produce any shock or noise, since the reverse gears 41 and 43 as well as the reverse idler gear 45 are stationary. When the shift lever is in its reverse position, the input shaft 3 and the output shaft 5 are coupled via the main gears 11 and 13 and via the reverse gears 41, 43, and 45.

Figure 3:
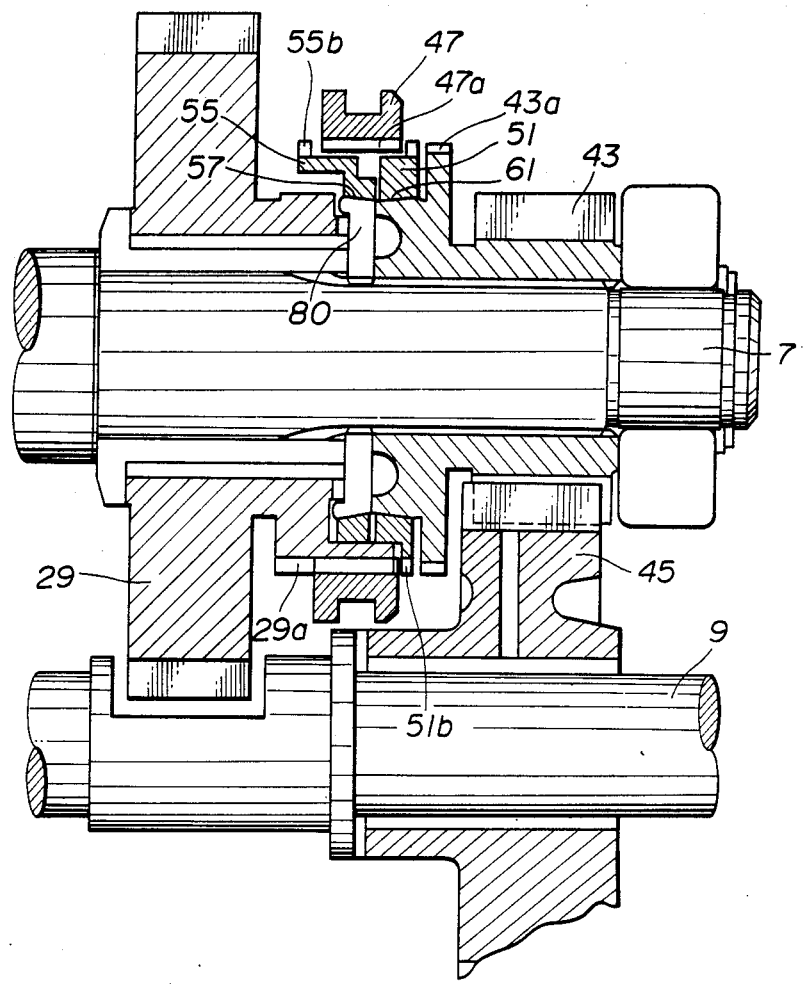
FIG. 3 is a longitudinal section view of a transmission reverse section according to a second embodiment of this invention.

FIG. 3 shows a second embodiment of this invention which is similar to the embodiment of FIGS. 1 and 2 except for the discussed design changes.

A fifth speed gear 29 rotatable relative to the counter shaft 7 has axially-extending external teeth 29a with which axially-extending internal teeth 47a on the coupling sleeve 47 is in constant mesh. Accordingly, the coupling sleeve 47 rotates together with the fifth speed gear 29 but is free to move axially with respect to the gear 29. A fifth speed synchronizing ring 51 and a reverse synchronizing ring 55 are supported on the fifth speed gear 29 so that they rotate together with the gear 29. The synchronizing rings 51 and 55 are movable axially. The synchronizing rings 51 and 55 have external blocker teeth 51b and 55b engageable with the internal teeth 47a on the coupling sleeve 47. The reverse gear 43 secured to the counter shaft 7 has an extension formed with a synchronizing tapered surface 61. This surface 61 is engageable with a mating tapered surface on the fifth speed synchronizing ring 51. An annular member 80 secured to the counter shaft 7 has a synchronizing surface 57 engageable with a mating tapered surface on the reverse synchronizing ring 55.

The reverse gear 43 is in constant mesh with a reverse idler gear 45 journaled on the reverse idler shaft 9. The reverse idler gear 45 is also in constant mesh with another reverse gear 41 journaled on the output shaft 5 (see FIG. 1). Accordingly, the reverse gear 43 has a constant connection with the reverse gear 41 by way of the reverse idler gear 45. A reverse clutch (not shown) supported on the output shaft 5 releasably locks the reverse gear 41 to the output shaft 5. The reverse clutch is connected to the shift lever so as to be drivable via the shift lever. When the shift lever is moved into and out of its reverse position, the reverse clutch is engaged and disengaged respectively.

As the coupling sleeve 47 moves toward its fifth speed position (toward the right in FIG. 3), the coupling sleeve 47 forces the synchronizing ring 51 into engagement with the synchronizing surface 61. This engagement synchronizes the coupling sleeve 47 and the extension of the reverse gear 43. After the internal teeth 47a on the sleeve 47 engage the blocker teeth 51b on the ring 51, these internal teeth 47a move into engagement with axially-extending external teeth 43a on the extension of the reverse gear 43. Thus, the fifth speed gear 29 is locked to the counter shaft 7. It should be noted that the reverse gear 43 is fixed to the counter shaft 7.

In this embodiment, the synchronizing ring 55 provides a rotating member connected to the output shaft so that it rotates and stops according to the rotation and stopping of the output shaft. The connection is via the fifth gear 29 and the coupling sleeve 47. Means are provided for synchronizing the rotational speed of the reverse gear to the rotational speed of the synchronizing ring and rotating member 55. For this purpose, as the coupling sleeve 47 moves toward its reverse position, (toward the left in FIG. 3) the coupling sleeve 47 forces the synchronizing ring 55 into engagement with the synchronizing surface 57. This engagement synchronizes the coupling sleeve 47 and the annular member 80. Accordingly, the reverse gears 41, 43, and 45 all become stationary provided that the fifth speed gear 29 is stationary. Then, means are provided for disabling the synchronizing means including the internal teeth 47a on the coupling sleeve 47 which move into normal engagement with the blocker teeth 55b on the synchronizing ring 55 and the reverse gear 43 is released from the fifth speed gear 29 once again.

This invention may include other modifications. In one modification, the reverse synchronizing ring 55 and the reverse synchronizing surface 57 may be installed near one of the speed gears other than the fifth speed gear 29. In another modification, the coupling sleeve 47 may act only on the reverse section.

What is claimed is:

1. A transmission shiftable toward and into a reverse position, comprising:
   (a) a counter shaft;
   (b) a rotatable output shaft;
   (c) a rotatable reverse gear supported on the counter shaft;
   (d) a rotatable member;
   (e) means for rotating and stopping the member as the output shaft rotates and stops respectively; and
   (f) means for synchronizing the rotational speed of the reverse gear to the rotational speed of the member when the transmission is shifted toward the reverse position.

2. The transmission of claim 1, further comprising means for disabling the synchronizing means when the transmission is shifted into the reverse position.

3. The transmission of claim 1, wherein the synchronizing means comprises:
   (a) a first synchronizing element connected to the reverse gear for rotation together with rotation of the reverse gear, the first element having a first synchronizing surface;
   (b) a second synchronizing element included in the rotatable member and having a second synchronizing surface mating with the first surface; and
   the first and second elements being movable relative to each other so that the first and second surfaces engage with and separate from each other;
   (c) means for providing relative movement of the first and second elements to engage the first and second surfaces with each other when the transmission is shifted toward the reverse position.

4. The transmission of claim 3, wherein the first and second elements are annular, and the first and second surfaces are tapered.

5. The transmission of claim 3, wherein the transmission is shiftable into a forward position and further comprising means for rotating the first and second synchronizing elements together with each other when the transmission is in the forward position.

6. The transmission of claim 1, wherein:
   the counter shaft is rotatable;
   the reverse gear is fixed to the counter shaft;
   the rotating/stopping means comprises first and second rotatable gears in constant mesh with each other, the first gear being fixed to the output shaft, the second gear being supported on the counter shaft and rotatable relative to the counter shaft;
   the rotatable member comprises an annular member having a first tapered synchronizing surface, the annular member being mounted on the second gear for rotation and stop in accordance with rotation and stop of the second gear respectively;
   the synchronizing means comprises a synchronizing ring connected to the reverse gear for rotation together with rotation of the reverse gear, the ring having a second tapered synchronizing surface mating with the first surface, means for supporting and allowing the ring to move relative to the annular member so that the first and second surfaces engage with and separate from each other, and a movable coupling sleeve for moving the ring to engage the first and second surfaces with each other when the transmission is shifted toward the reverse position.

7. The transmission of claim 1, wherein:
   the counter shaft is rotatable;
   the reverse gear is fixed to the counter shaft;
   the rotating/stopping means comprises first and second rotatable gears in constant mesh with each other, the first gear being fixed to the output shaft, the second gear being supported on the counter shaft and rotatable relative to the counter shaft;
   the rotatable member comprises a synchronizing ring mounted on the second gear for rotation and stop in accordance with rotation and stop of the second gear respectively, the ring having a first tapered synchronizing surface;
   the synchronizing means comprises an annular member connected to the reverse gear for rotation together with rotation of the reverse gear, the annular member having a second tapered synchronizing surface mating with the first surface, means for means for supporting and allowing the ring to move relative to the annular member so that the first and second surfaces engage with and separate from each other, and a movable coupling sleeve for moving the ring to engage the first and second surfaces with each other when the transmission is shifted toward the reverse position.

8. A transmission having forward and reverse positions, said transmission comprising:
   an output shaft;
   a counter shaft;
   forward gear means rotatably supported on said counter shaft;
   reverse gear means rotatably supported on said counter shaft;
   a shift sleeve concentrically disposed with respect to said counter shaft;
   a synchronizer ring for said forward gear means having a conical surface, said ring being rotatable with said shift sleeve;
   a conical surface on one of said gear means for coaction with the conical surface on said ring to synchronize said forward gear means when the transmission is shifted toward the forward position;
   an annular rotatable member;
   means for rotating and stopping the member as the output shaft rotates and stops, respectively; and
   means for synchronizing the rotational speed of the reverse gear to the rotational speed of the member when the transmission is shifted toward the reverse position;
   the conical synchronizing surfaces being concentrically disposed with respect to the shift sleeve and said counter shaft, said ring and said member being concentrically disposed with respect to said counter shaft, and said ring, said member and said shift sleeve being movable axially relative to each other.

9. The transmission of claim 8 wherein the shift sleeve and the synchronizing rings are jointly rotatable with the counter shaft.

10. The transmission of claim 9 wherein the annular member is connected to said forward gear means for rotation therewith.

11. The transmission of claim 8 wherein the shift sleeve and the synchronizing rings are jointly rotatable with the forward gear means.

12. The transmission of claim 11 wherein the annular member is connected to the counter shaft for rotation therewith.

13. A transmission shiftable toward a forward position and a reverse position, comprising:
   (a) a rotatable counter shaft;
   (b) a rotatable output shaft,
   (c) a reverse gear mounted on the counter shaft for rotation together with the counter shaft;
   (d) a forward gear supported on the counter shaft and rotatable relative to the counter shaft;
   (e) means for coupling the forward gear to the output shaft to rotate and stop the forward gear as the output shaft rotates and stops respectively;
   (f) a forward synchronizer supported on the counter shaft for synchronizing the forward gear and the counter shaft;
   (g) a reverse synchronizer separated from the forward synchronizer and supported on the counter shaft for synchronizing the referse gear an the forward gear; and
   (h) a coupling sleeve movable between first and second positions, the coupling sleeve activating the forward synchronizer when the coupling sleeve moves toward the first position in accordance with shift of the transmission toward the forward position, the coupling sleeve activating the reverse synchronizer when the coupling sleeve moves toward the second position in accordance with shift of the transmission toward the reverse position.

14. The transmission of claim 13, wherein the reverse synchronizer comprises:
   (a) an annular block connected to the forward gear for rotation together with the forward gear and having a first synchronizing surface;
   (b) a synchronizing ring connected to the reverse gear for rotation together with the reverse gear and having a second synchronizing surface, the synchronizing ring being movable relative to the annular block, the second synchronizing surface being engageable with the first synchronizing surface in accordance with movement of the synchronizing ring relative to the annular block; and
   the coupling sleeve moving the synchronizing ring relative to the annular block to engage the first and second synchronizing surfaces when the transmission is shifted toward the reverse position.

15. The transmission of claim 13, wherein the reverse synchronizer comprises:
   (a) an annular block connected to the reverse gear for rotation together with the reverse gear and having a first synchronizing surface;
   (b) a synchronizing ring connected to the forward gear for rotation together with the forward gear and having a second synchronizing surface, the synchronizing ring being movable relative to the annular block, the second synchronizing surface being engageable with the first synchronizing surface in accordance with movement of the synchronizing ring relative to the annular block; and
   the coupling sleeve moving the synchronizing ring relative to the annular block to engage the first and second synchronizing surfaces when the transmission is shifted toward the reverse position.

* * * * *